United States Patent
Ka et al.

(10) Patent No.: US 12,431,586 B2
(45) Date of Patent: Sep. 30, 2025

(54) SEPARATOR COMPRISING DUAL COATING LAYERS AND SECONDARY BATTERY COMPRISING THE SAME

(71) Applicant: LG CHEM, LTD., Seoul (KR)

(72) Inventors: Kyung Ryun Ka, Daejeon (KR); Su Jin Park, Daejeon (KR); Sang Joon Lee, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 640 days.

(21) Appl. No.: 17/051,280

(22) PCT Filed: Jan. 16, 2020

(86) PCT No.: PCT/KR2020/000821
§ 371 (c)(1),
(2) Date: Oct. 28, 2020

(87) PCT Pub. No.: WO2020/149674
PCT Pub. Date: Jul. 23, 2020

(65) Prior Publication Data
US 2021/0050577 A1 Feb. 18, 2021

(30) Foreign Application Priority Data
Jan. 18, 2019 (KR) .......... 10-2019-0006988

(51) Int. Cl.
*H01M 10/00* (2006.01)
*H01M 10/0525* (2010.01)
(Continued)

(52) U.S. Cl.
CPC ..... *H01M 50/417* (2021.01); *H01M 10/0525* (2013.01); *H01M 50/403* (2021.01);
(Continued)

(58) Field of Classification Search
CPC .......... H01M 50/457; H01M 10/0525; H01M 50/403; H01M 50/409; H01M 50/417;
(Continued)

(56) References Cited

U.S. PATENT DOCUMENTS 11,769,929 B2 * 9/2023 Sung ................... H01M 50/449
429/144
2008/0102361 A1 5/2008 Lee et al.
(Continued)

FOREIGN PATENT DOCUMENTS

CN 104205415 A 12/2014
CN 104425788 A 3/2015
(Continued)

OTHER PUBLICATIONS

Machine translation of KR20080082289, obtained from KIPO on Mar. 31, 2023 (Year: 2008).*
(Continued)

*Primary Examiner* — Nicholas P D'Aniello
(74) *Attorney, Agent, or Firm* — Birch, Stewart, Kolasch & Birch, LLP

(57) ABSTRACT

A separator having a polyolefin substrate, first coating layer including first inorganic particles on at least one surface of the polyolefin substrate and a second coating layer including second inorganic particles on a surface of the first coating layer opposite the polyolefin substrate. An average particle size of the first inorganic material particles of the first coating layer is greater than an average particle size of the second inorganic material particles of the second coating layer. The first inorganic particles of the first coating layer are 900 nm or more based on D50, and the second inorganic particles of the second coating layer are 10 nm or more and 500 nm or less based on D50.

10 Claims, 3 Drawing Sheets

(51) Int. Cl.
  *H01M 50/403* (2021.01)
  *H01M 50/409* (2021.01)
  *H01M 50/411* (2021.01)
  *H01M 50/417* (2021.01)
  *H01M 50/431* (2021.01)
  *H01M 50/443* (2021.01)
  *H01M 50/457* (2021.01)
  *H01M 50/489* (2021.01)

(52) U.S. Cl.
  CPC ....... *H01M 50/409* (2021.01); *H01M 50/411* (2021.01); *H01M 50/431* (2021.01); *H01M 50/443* (2021.01); *H01M 50/457* (2021.01); *H01M 50/489* (2021.01)

(58) Field of Classification Search
  CPC . H01M 50/431; H01M 50/443; H01M 50/489
  See application file for complete search history.

(56) References Cited

U.S. PATENT DOCUMENTS

| | | | |
|---|---|---|---|
| 2014/0322586 A1* | 10/2014 | Lee | H01M 50/457 429/144 |
| 2016/0149184 A1* | 5/2016 | Nam | H01M 50/431 429/144 |
| 2016/0156010 A1 | 6/2016 | Chen et al. | |
| 2017/0092930 A1 | 3/2017 | Chae et al. | |
| 2017/0250400 A1* | 8/2017 | Ai | H01M 4/623 |
| 2018/0277815 A1 | 9/2018 | Sung et al. | |
| 2019/0020008 A1 | 1/2019 | Kim et al. | |

FOREIGN PATENT DOCUMENTS

| | | | | |
|---|---|---|---|---|
| CN | 104051696 B | | 2/2017 | |
| EP | 3316346 A1 | | 6/2018 | |
| EP | 3382931 A1 | | 10/2018 | |
| JP | 2018-40784 A | | 3/2016 | |
| JP | 2018-170215 A | | 11/2018 | |
| KR | 10-2008-0082288 A | | 9/2008 | |
| KR | 20080082289 | * | 9/2008 | .......... H01M 50/449 |
| KR | 10-2013-0123568 A | | 11/2013 | |
| KR | 10-2014 0070484 A | | 6/2014 | |
| KR | 10-2014-0073957 A | | 6/2014 | |
| KR | 20140073957 A | * | 6/2014 | .......... H01M 50/411 |
| KR | 10-2018-0019991 A | | 2/2015 | |
| KR | 10-2016-0007147 A | | 1/2016 | |
| KR | 10-2016-0139639 A | | 12/2016 | |
| KR | 10-2017-0034725 A | | 3/2017 | |
| KR | 10-1736543 B1 | | 5/2017 | |
| KR | 10-2018-0106370 A | | 10/2018 | |

OTHER PUBLICATIONS

Machine translation of KR20140073957A, obtained from PE2E on Mar. 31, 2023 (Year: 2014).*
Machine translation of KR-1020080082289, obtained Mar. 2024 (Year: 2008).*
BLäubaum et al., "Impact of Particle Size Distribution on Performance of Lithium-Ion Batteries", ChemElectroChem, 2020, pp. 1-24 (25 pages total).
Roostaei et al., "Comparison of Various Particle-Size Distribution-Measurement Methods", SPE Reservoir Evaluation & Engineering, 2020, pp. 1-21.
International Search Report (PCT/ISA/210) issued in PCT/KR2020/000821 mailed on Apr. 28, 2020.
Extended European Search Report, dated Apr. 29, 2021 for European Application No. 20741906.0.

* cited by examiner

[FIG. 1]
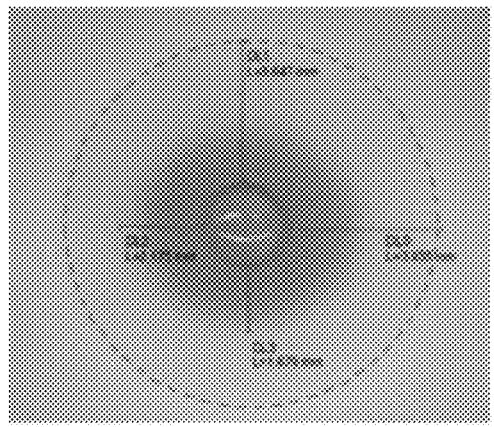
Impregnation distance: 3.84mm
<Example 1>
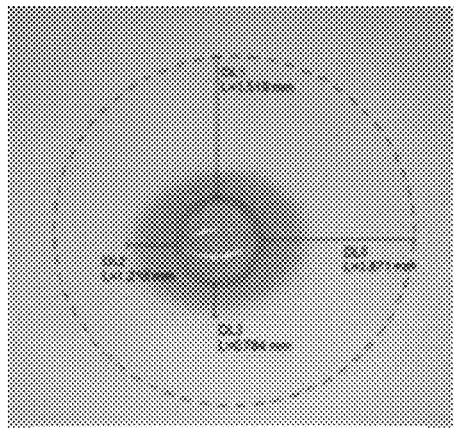
Impregnation distance: 3.65mm
<Example 2>
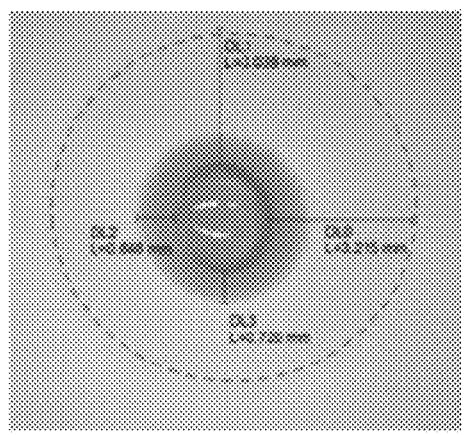
Impregnation distance: 3.13mm
<Example 3>
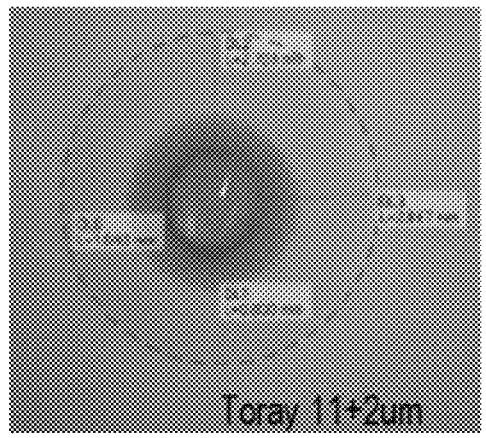
Impregnation distance: 2.75mm
<Comparative Example 1>

[FIG. 2]
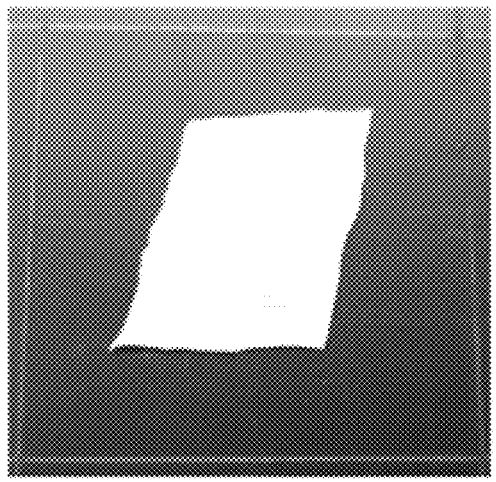
<Example 1>
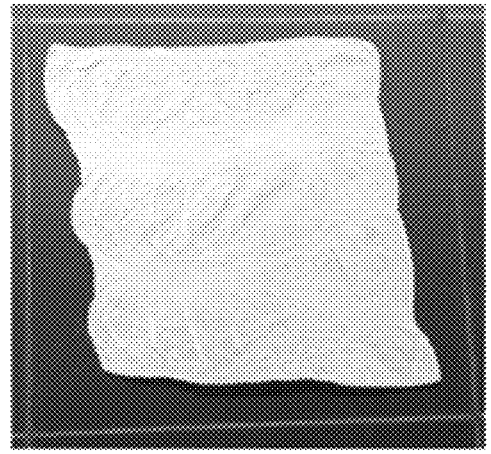
<Example 2>
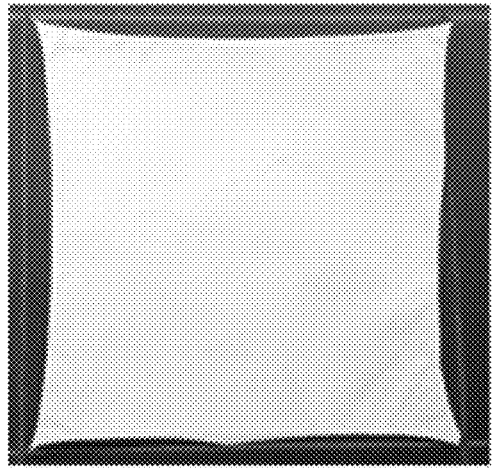
<Example 3>
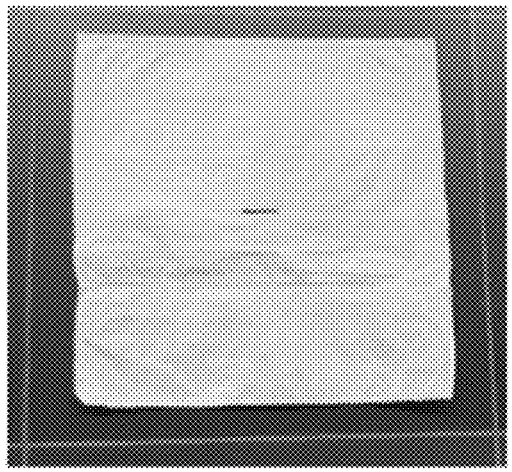
<Comparative Example 1>

[FIG. 3]
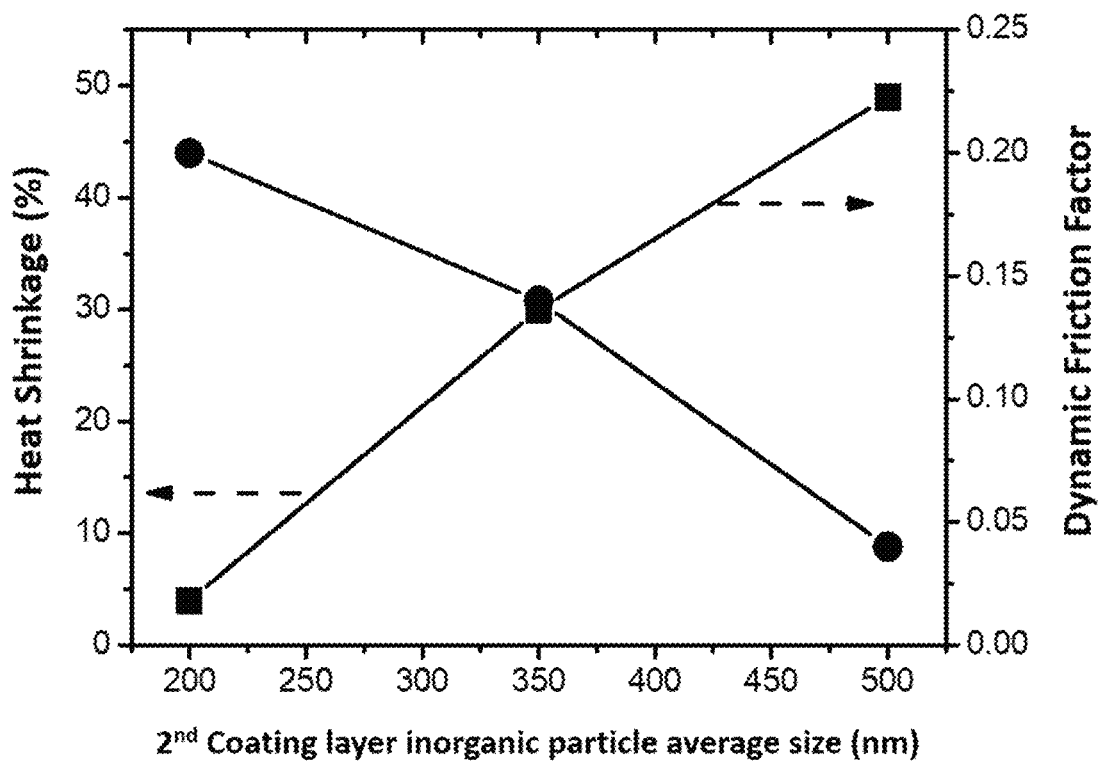

SEPARATOR COMPRISING DUAL COATING LAYERS AND SECONDARY BATTERY COMPRISING THE SAME

TECHNICAL FIELD

This application claims the benefit of priority to Korean Patent Application No. 2019-0006988 filed on Jan. 18, 2019, the disclosure of which is hereby incorporated by reference herein its entirety.

The present invention relates to a separator having a dual coating layer and a secondary battery comprising the same, and particularly, a separator having a first coating layer comprising a first inorganic material formed on at least one surface of a polyolefin substrate and a second coating layer comprising a second inorganic material formed on the first coating layer, and a lithium secondary battery comprising the same.

BACKGROUND ART

As demand for portable electronic devices such as smartphones, pads, and laptop computers has increased, the demand for secondary batteries as their energy sources has also sharply increased. Among secondary batteries, lithium secondary batteries having high energy density and long battery lifespan are most widely used.

A lithium secondary battery is fabricated by inserting an electrode assembly, which is prepared by alternately stacking a positive electrode and a negative electrode after interposing a separator between the positive electrode and the negative electrode, into a battery case made of a can or a pouch of a predetermined size and shape and then finally injecting an electrolyte solution therein. The electrolyte solution permeates between the positive electrode, the negative electrode and the separator by capillary force.

In order for the lithium secondary battery to have high capacity and high energy density and to maintain long lifespan, the electrode assembly interposed in the battery must be completely impregnated with the electrolyte solution. When the electrode assembly is impregnated with the electrolyte solution incompletely, the reaction between the electrodes is not smooth, the resistance increases, and the output characteristics and the capacity of the battery drop sharply. As a result, the performance of the battery deteriorates, the lifespan of the battery is shortened, and the high internal resistance can cause the battery to overheat or explode.

The positive electrode, the negative electrode, and separator are often hydrophobic, but the electrolyte solution is often hydrophilic. Due to these differences, it requires a considerable amount of time and process conditions to increase the impregnation of the electrolyte solution into the electrode and separator.

In order to improve the impregnation of the electrolyte solution, a method of injecting the electrolyte solution at a high temperature or injecting the electrolyte solution under pressure or under reduced pressure has been used. When using such a method, other problems arise, such as the electrode assembly and the electrolyte solution being deformed by heat, causing an internal short circuit and the like.

In the case of a jelly-roll type electrode assembly, there is a problem in that an electrolytic solution may be unevenly impregnated between the winding core and the outer side, thereby deteriorating the lifespan characteristics of the battery.

Patent Document 1 relates to an electrode assembly capable of improving the impregnation of an electrolyte solution. The electrode assembly includes a radical unit having an electrode and a separator alternately coupled, and a main separator folded in a state where a plurality of radical units are arranged and attached, and a through-hole formed in the main separator in a non-folded state, the through-hole being configured to pass an electrolyte solution through between the radical units.

Patent Document 2 relates to an electrode assembly in which a separator is interposed between electrodes having opposite polarities and stacked. The electrode assembly includes a close contact region in which a portion of an interface between an electrode and a separator is in close contact, and provides the remaining portions excluding the close contact region as an electrolyte solution flow path.

Patent Document 3 provides a method of manufacturing a battery cell in which a jelly-roll type electrode stack is embedded with an electrolyte solution in a cell case. In the process of storing the electrode stack in a chamber and impregnating the electrode stack with the electrolyte solution, vibration is applied to the electrode stack or the chamber.

Patent Document 1 is intended to form the through-hole through which the electrolyte can pass, Patent Document 2 is intended to form the electrolyte solution flow path through which the electrolyte can penetrate and move, and Patent Document 3 is intended to improve the diffusion rate and impregnation of the electrolyte solution by applying vibration. However, they have not disclosed the physical properties of a separator. That is, a configuration to improve the performance of secondary batteries by improving the heat shrinkage of the separator and the frictional force between an electrode and the separator while improving the impregnation of an electrolyte solution has not been disclosed.

PRIOR ART DOCUMENT

Patent Document 1: Korean Patent No. 1736543 (2017 May 10)
Patent Document 2: Korean Patent Application Publication No. 2016-0139639 (2016 Dec. 7)
Patent Document 3: Korean Patent Application Publication No. 2018-0106370 (2018 Oct. 1)

DISCLOSURE

Technical Problem

The present invention has been made in view of the above problems, and it is an object of the present invention to provide a separator that is capable of reducing the heat shrinkage of the separator while improving the impregnation of an electrolyte solution, and a secondary battery comprising the same.

Technical Solution

In accordance with the present invention, the above and other objects can be accomplished by the provision of a separator having a polyolefin substrate; a first coating layer comprising first inorganic material particles on at least one surface of the polyolefin substrate and a second coating layer comprising second inorganic material particles on a surface of the first coating layer opposite the polyolefin substrate An average particle size of the first inorganic material particles is greater than an average particle size of the second inorganic material particles. In particular, the average particle size of the first inorganic material particles may be 900 nm or more based on D50, and the average particle size of the second inorganic material particles may be 10 nm or more and 500 µm or less based on D50.

The second coating layer is in contact with an electrode may have a high frictional force, and particularly, the dynamic friction factor of the second coating layer may be 0.01 or more and 0.2 or less.

The inorganic material of the second coating layer may be 20 wt % or less of the total inorganic material.

The total thickness of the first coating layer and the second coating layer may be 1 µm or more.

The first coating layer and the second coating layer may be formed by dip coating, slot-die coating or DM coating method, respectively.

The first coating layer and the second coating layer may use a mixture of inorganic particles and a binder polymer, and the kinds of inorganic particles of the first coating layer and the second coating layer may be different from each other.

The inorganic particles may include high-dielectric inorganic particles having a dielectric constant of 1 or more, inorganic particles having piezoelectricity, inorganic particles having lithium ion transfer ability, or a mixture of two or more thereof.

The inorganic particles may be at least one selected from the group consisting of $Al_2O_3$, $SiO_2$, MgO, $TiO_2$, $ZrO_2$, AlOOH, $Al(OH)_3$ and $BaTiO_3$.

The binder may be at least one selected from the group consisting of polyvinylidene fluoride (PVdF), polyvinylidene fluoride-hexafluoropropylene, polyvinyl pyrrolidone, polyacrylonitrile, polyvinylidene fluoride-trichloroethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), fluoro rubber, and polyimide.

The binder may further comprise at least one selected from among baicalin, luteolin, taxifolin, myricetin, quercetin, rutin, catechin, epigallocatechin gallate, butein, piceatannol, a phenolic-based compound comprising tannic acid, pyrogallic acid, amylose, amylopectin, xanthan gum, and an aqueous or non-aqueous polymer consisting of fatty acid system.

BRIEF DESCRIPTION OF DRAWINGS

FIG. 1 is test results of the impregnation of electrolyte solution according to Examples and Comparative Examples of the present invention.

FIG. 2 is test results of the heat shrinkage of separators according to Examples of the present invention.

FIG. 3 is a graph of the dynamic friction factor and heat shrinkage of a separator according to a particle size of a second inorganic material of the present invention.

DETAILED DESCRIPTION OF THE INVENTION

Hereinafter, the present invention will be described in detail. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method.

Consequently, the embodiments described in this specification are merely the most preferred embodiments and do not cover all technical ideas of the present invention, and therefore it should be understood that there may be various equivalents and modifications capable of substituting for the embodiments at the time of filing of the present application.

A separator according to an embodiment of the present invention may include a porous substrate having pores, a first coating layer, and a second coating layer.

1) Polyolefin Substrate

The porous substrate may be a polyolefin-based substrate.

The polyolefin may include homopolymers, copolymers, and mixtures thereof of olefins such as ethylene, propylene, 1-butene, 4-methyl-1-pentene, 1-hexene 1-octene, and the like. In particular, the polyolefin may be a polymer selected from the group consisting of polyethylene, polypropylene, polybutylene, polypentene, polyhexene, polyoctene, and the like, or a polymer film formed from a mixture of two or more thereof, or a multi-layer film, a woven fabric, a non-woven fabric thereof.

The polyolefin may include low density polyethylene (LDPE), linear low density polyethylene (LLDPE), and high density polyethylene (HDPE), and the like.

In the presence of the porous substrate, insulation between a negative electrode and a positive electrode is maintained. A type, a thickness, a pore size, and a number of pores of the porous substrate, and particularly, in a case of a non-woven fabric, a thickness of a superfine fiber, may be adjusted in consideration of a melting temperature, easiness to manufacture, a porosity, ion movement, insulation, and the like.

2) First Coating Layer

The first coating layer may be formed by coating on at least one surface of a separator substrate or within pores of the separator substrate. The first coating layer may include a first inorganic material to secure the physical properties of a separator, and a first binder.

The first binder functions to secure the adhesive strength between the first inorganic particles, the first coating layer and the separator substrate, and the first coating layer and the second coating layer.

An average particle size of the first inorganic material may be 900 nm or more based on D50.

The first inorganic material may be at least one selected from the group consisting of (a) an inorganic material having a dielectric constant of 5 or more, (b) an inorganic material having piezoelectricity, and (c) an inorganic material having lithium ion transfer ability.

The inorganic material (a) having a dielectric constant of 5 or more may be $SrTiO_3$, $SnO_2$, $CeO_2$, MgO, NiO, CaO, ZnO, $ZrO_2$, $Y_2O_3$, $Al_2O_3$, $TiO_2$, or SiC.

The inorganic material (b) having piezoelectricity has a potential difference due to positive and negative charges generated between both surfaces of the particle when a certain pressure is applied and may be at least one selected from the group consisting of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof.

The inorganic material (c) having lithium ion transfer ability is the inorganic material that contains lithium elements and transports lithium ions without storing lithium, and may be at least one selected from the group consisting of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$) such as $14Li_2O$-$9Al_2O_3$-$38TiO_2$-$39P_2O_5$, lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$) such as $Li_{3.25}Ge_{0.25}P_{0.7}S_4$, lithium nitride ($Li_xN_y$, where $0<x<4$ and $0<y<2$) such as $Li_3N$, $SiS_2$-based glass ($Li_xSi_yS_z$, where $0<x<3$, $0<y<2$, and $0<z<4$) such as $Li_3PO_4$—$Li_2S$—$SiS_2$, $P_2S_5$-based glass ($Li_xP_yS_z$, where $0<x<3$, $0<y<3$, and $0<z<7$) such as $LiI$—$Li_2S$—$P_2S_5$, and a mixture thereof.

The first binder may use one or more binders in order to obtain adhesive properties required for the first coating layer. For example, the binder polymer may be at least one selected from the group consisting of polyvinylidene fluoride (PVdF), polyvinylidene fluoride-hexafluoropropylene, polyvinyl pyrrolidone, polyacrylonitrile, polyvinylidene fluoride-trichloroethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), fluoro rubber, and polyimide.

The first binder may further comprise at least one selected from among baicalin, luteolin, taxifolin, myricetin, quercetin, rutin, catechin, epigallocatechin gallate, butein, piceatannol, a phenolic-based compound comprising tannic acid, pyrogallic acid, amylose, amylopectin, xanthan gum, and an aqueous or non-aqueous polymer consisting of fatty acid system.

In a concrete example, the first binder may include a PVdF-based binder capable of phase separation, and the content of the PVdF-based binder may be 80 wt % or more based on the total weight of the binder. When the content of the PVdF-based binder is less than 80 wt %, it is not preferable because it is difficult to increase the porosity of the inorganic coating layer to a desired level.

In particular, the PVdF-based binder may be at least one selected from the group consisting of PVdF and PVdF copolymers.

More particularly, the PVdF copolymers may have a content of PVdF monomer of 92 mol % or more based on the total moles of monomers constituting the copolymer. When the content of the PVdF monomer is less than 92 mol %, the occurrence of phase separation is reduced, making it difficult to increase the porosity of the inorganic coating layer to a desired level.

3) Second Coating Layer

The second coating layer may be formed on the first porous coating layer, and includes a second inorganic material and a second binder.

The second inorganic material includes the second inorganic material to secure the physical properties of a separator, and the second binder for fixing the second inorganic material, coupling of the first coating layer and the second coating layer, and providing the adhesive strength between the second coating layer and an electrode.

An average particle size of the second inorganic material may be 10 nm to 500 nm based on D50, and the second inorganic material may be the same as or different from the first inorganic material.

The second inorganic material may be 20 wt % or less, preferably 15 wt % or less based on the total inorganic material ratio.

The second binder functions to secure the adhesive strength between the second inorganic particles, the first coating layer and the second coating layer, and the second coating layer and the electrode.

The second binder may be the same as or different from the first binder.

The coating method of the first coating layer and the second coating layer is not particularly limited, for example, the application method of the material is not particularly limited. For example, the first coating layer and the second coating layer may be formed by DIP coating, Slot-die coating or DM coating method.

4) Electrochemical Device

A separator according to an embodiment of the present invention may be applied to a battery including the separator. In particular, the present invention provides an electrochemical device including a positive electrode and a negative electrode, the separator interposed between the positive electrode and the negative electrode, and an electrolyte. Here, the electrochemical device may be a lithium secondary battery.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent accounts for 1 to 30 wt % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of a negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a non-graphitized carbon or a graphite-based carbon; a metal composite oxide, such as $Li_xFe_2O_3$ ($0 \leq x \leq 1$), $Li_xWO_2$, ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 < x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

Hereinafter, the present invention will be described with reference to the following examples. These examples are provided only for illustration of the present invention and should not be construed as limiting the scope of the present invention.

Example 1

A first binder solution was prepared by adding 5 parts by weight of PVDF-based binder as a first binder to 95 parts by weight of acetone.

A first slurry was prepared by mixing and dispersing, in the first binder solution, a first inorganic material having an average particle size of 900 nm at a first binder: first inorganic material ratio of 10:90.

A second binder solution was prepared by adding 5 parts by weight of PVDF-based binder as a second binder to 95 parts by weight of acetone.

A second slurry was prepared by mixing and dispersing, in the second binder solution, a second inorganic material having an average particle size of 500 nm at a second binder: second inorganic material ratio of 10:90.

$Al_2O_3$ was used as the first inorganic material and the second inorganic material.

A first coating layer and a second coating layer on the first coating layer were formed by coating the prepared first slurry and second slurry on a polyethylene porous substrate (Celgard, PP1615) by a double-layer slide-slot coating method. The thickness of the first coating layer was adjusted to about 3 μm to 4 μm, and the thickness of the second coating layer was adjusted to about 1 μm to 2 μm.

Example 2

A separator was prepared by the same method of Example 1, except that only an inorganic material having an average particle size of 350 nm was used as a second inorganic material.

Example 3

A separator was prepared by the same method of Example 1, except that only an inorganic material having an average particle size of 200 nm was used as a second inorganic material.

Comparative Example 1

A separator was prepared by the same method of Example 2, except that only an inorganic material having an average particle size of 700 nm was used as a first inorganic material.

Comparative Example 2

A separator was prepared by the same method of Example 2, except that only an inorganic material having an average particle size of 500 nm was used as a first inorganic material.

Experimental Example

1) Separator Electrolyte Solution Impregnation Test (PC Drop Test)

After the separators prepared in Examples 1 to 3 and Comparative Examples 1 to 2 are placed on a slide glass and fixed, a 10 µl syringe is filled with 2 µl of electrolyte solution to make droplets and dropped on the separators. After 5 minutes, the distance diffused out of the droplet is measured in the MD/TD direction.

2) Measurement of Frictional Force of Separator Surface

The surface frictional force of a separator is a dynamic friction factor, which means the friction factor once a movement is in progress.

The surface frictional force of the separator was measured according to ASTM D1894-06.

① Tape the 250×130 mm (10-5 in.) separator to the plane in the 250 mm direction.

② Tape the separator to the back of the slide pulling it tight to eliminate wrinkles without stretching it.

③ Attach the specimen using the eye screw to the nylon filament.

④ Start the driving system set to a speed of 150±30 mm/min.

⑤ Record the visual average reading during a run of approximately 130 mm (5 in.) while the surfaces are sliding uniformly over one another.

Here, a polished plastic, wood, or metal sheet is used as the plane. The size of the plane is approximately 150×300×1 mm. A smooth, flat piece of glass may cover the upper surface of the plane. This provides a smooth support for the specimen (the separator).

The sled is a metal block, 63.5 mm square by approximately 6 mm thick with a suitable eye screw fastened in one end.

3) Measurement of Heat Shrinkage of Separator

After five separator specimens were tailored to a width (MD) of 50 mm×a length (TD) of 50 mm at five different points, marked to indicate MD/TD directions, and placed in a 150° C. convection oven for 30 minutes, heat shrinkage is calculated by measuring the degree of shrinkage in the width and length directions of each specimen.

4) Measurement of Air Permeability of Separator

The Gurley type measuring device measured the time for 100 cc of airflow to completely pass through by each measuring position (OS, CN, DS).

The properties of the separators prepared in Examples 1 to 3 and Comparative Examples 1 to 2, respectively, are shown in Table 1 below.

TABLE 1

|  | Example 1 | Example 2 | Example 3 | Comparative Example 1 | Comparative Example 2 |
|---|---|---|---|---|---|
| Average particle size of first coating inorganic material (nm) | 900 | 900 | 900 | 700 | 500 |
| Average particle size of second coating inorganic material (nm) | 500 | 350 | 200 | 350 | 350 |
| Thickness of first coating layer (µm) | 3~4 | 3~4 | 3~4 | 3~4 | 3~4 |
| Thickness of second coating layer (µm) | 1~2 | 1-2 | 1~2 | 1~2 | 1~2 |
| Dynamic friction factor | 0.04 | 0.14 | 0.20 | 0.15 | 0.14 |
| Impregnation distance of electrolyte solution (mm) | 3.84 | 3.65 | 3.13 | 2.75 | 2.13 |
| Heat shrinkage (%) | 49 | 30 | 4 | 23 | 15 |
| Air permeability (sec/100 cc) | 155 | 170 | 190 | 176 | 185 |
| Resistance (Ω) | 0.53 | 0.61 | 0.70 | 0.67 | 0.69 |

FIG. 1 is test results (PC drop test) of an impregnation of electrolyte solution according to Examples and Comparative Examples of the present invention.

Referring to FIG. 1, the larger the average particle size of the first inorganic material, the better the impregnation of the electrolyte solution of the separator. When the average particle size of the first inorganic material was 900 nm, the impregnation distance of electrolyte solution was 3.13 mm to 3.84 mm depending on the average particle of the second inorganic material.

In the case that the average particle of the second inorganic material is the same, when the average particle size of the first inorganic material was 500 nm, 700 nm, and 900 nm, respectively, then the impregnation distance of electrolyte solution according to the electrolyte solution impregnation test was 2.13 mm, 2.75 mm, and 3.84 mm, respectively. When the average particle size of the first inorganic material was increased from 500 nm to 900 nm, the impregnation distance of electrolyte solution was increased by about 1.8 times.

That is, in order to satisfy the impregnation distance 3.00 mm required by recently used batteries, it has been found that the particles of the first inorganic material need to be at least 900 nm.

FIG. 2 is test results of the heat shrinkage of separators according to Examples of the present invention.

Referring to FIG. 2, the smaller the average particle size of the second inorganic material, the less the heat shrinkage of the separator. In the case that the average particle of the first inorganic material is the same, when the average particle size of the second inorganic material was 200 nm and 500 nm, respectively, the heat shrinkage of the separator was 4% and 49%, respectively. That is, when the average particle size of the second inorganic material was reduced by 2.5 times, it has been found that the heat shrinkage of the separator was reduced by about 12 times or more. In order to satisfy the shrinkage of 50% or less required by recently used batteries, it has been found that the particles of the second inorganic material need to be 500 nm or less.

FIG. 3 is a graph of the dynamic friction factor and heat shrinkage of a separator according to a particle size of the second inorganic material of the present invention.

Referring to FIG. 3, the smaller the average particle size of the second inorganic material, the higher the dynamic friction factor. In the case that the average particle of the first inorganic material is the same, when the average particle size of the second inorganic material was 200 nm and 500 nm, respectively, the dynamic friction factor of the separator was 0.2 and 0.04, respectively. That is, when the average particle size of the second inorganic material was reduced by 2.5 times, it has been found that the dynamic friction factor of the separator was increased by about 5 times or more. When the average particle size of the second inorganic material exceeds 500 nm, the dynamic friction factor is expected to converge to 0. In this case, actual application is expected to be very difficult.

As the dynamic friction factor of the separator surface increases, it is possible to prevent the slip phenomenon due to the process of positioning or winding the electrode on the separator. That is, it is easy to mount the electrode in place on the separator, thereby improving the efficiency of the manufacturing process.

According to an embodiment of the present invention, when a first coating layer is formed using a first inorganic material having an average particle size of 900 nm or more, and a second inorganic material having an average particle size of 500 nm or less is formed on an upper surface of the first coating layer, it can be seen that the characteristics of the heat shrinkage of the separator, the impregnation of the electrolyte solution, and the dynamic friction factor of the separator surface satisfy the conditions required in the actual process.

Although described above with reference to examples of the present invention, those skilled in the art to which the present invention pertains will appreciate that various applications and modifications are possible based on the above description, without departing from the scope of the present invention.

INDUSTRIAL APPLICABILITY

As described above, the separator according to an embodiment of the present invention has the advantage of simultaneously improving the alignment of the electrode assembly and impregnation of the electrolyte solution while maintaining stability at high temperatures.

Since the separator according to the present invention has a high dynamic friction factor of the second coating layer, it is possible to prevent the slip phenomenon due to the process of positioning or winding the electrode on the separator, and it is easy to mount the electrode in place on the separator, thereby improving the efficiency of the manufacturing process. Since conventional separators are not designed in consideration of the dynamic friction factor, the conventional separators do not have a special effect according to the present invention.

In addition, it is possible to improve the impregnation of electrolyte solution while maintaining stability at a high temperature by a structure in which the first coating layer including the first inorganic material and the second coating layer including the second inorganic material having a relatively smaller particle size than the first inorganic material are formed on the first coating layer.

When the impregnation of electrolyte solution is good, the charge and discharge characteristics, high rate capability, and the like of the battery become excellent, thereby improving the overall performance of the battery. In the conventional separator, an inorganic material layer was added to the separator in consideration of only stability at high temperatures, but the present invention has an advantage of satisfying both characteristics.

The invention claimed is:

1. A separator for a battery, comprising:
   a polyolefin substrate;
   a first coating layer comprising first inorganic material particles formed on at least one surface of and in direct contact with the polyolefin substrate; and
   a second coating layer comprising second inorganic material particles formed on a surface of and in direct contact with the first coating layer, wherein the second coating layer is in direct contact with an electrode, and wherein the first coating layer is between the polyolefin substrate and the second coating layer, wherein
   an average particle size of the first inorganic material particles is greater than an average particle size of the second inorganic material particles,
   the average particle size of the first inorganic material particles is 900 nm or more based on D50,
   the average particle size of the second inorganic material particles is 10 nm or more and 350 nm or less based on D50, and
   the second inorganic material is 20 wt % or less of a total inorganic material ratio.

2. The separator for the battery according to claim 1, wherein the second coating layer has a dynamic friction factor is 0.01 or more and 0.2 or less.

3. The separator for the battery according to claim 1, wherein a thickness of the first coating layer is 3 μm or more and 4 μm or less, and a thickness of the second coating layer is 1 μm or more and 2 μm or less.

4. The separator for the battery according to claim 1, wherein the first coating layer and the second coating layer are coated by dip coating, slot-die coating or direct metering (DM) coating.

5. The separator for the battery according to claim 1, wherein the first inorganic material particles and the second inorganic material particles are different from each other.

6. The separator for the battery according to claim 5, wherein the first inorganic material particles and the second inorganic material particles are each independently at least one selected from the group consisting of high dielectric inorganic particles having a dielectric constant of 1 or more, inorganic particles having piezoelectricity, inorganic particles having lithium ion transfer ability.

7. The separator for the battery according to claim 6, wherein the first inorganic material particles and the second inorganic material particles are each independently at least one selected from the group consisting of $Al_2O_3$, $SiO_2$, MgO, $TiO_2$, $ZrO_2$, AlOOH, $Al(OH)_3$ and $BaTiO_3$.

8. A secondary battery comprising the separator for the battery according to claim 1.

9. The separator for the battery according to claim 1, wherein the separator has an impregnation distance of electrolyte solution of 3.00 mm or more.

10. The separator for the battery according to claim 9, wherein the impregnation distance of the electrolyte solution is measured by fixing the separator on a slide glass, dropping a droplet of the electrolyte solution on the separator, and after 5 minutes, measuring a distance diffused out of the droplet in a MD/TD direction.

* * * * *